June 6, 1944.   K. FISCHER   2,350,343
FLOW METER
Filed Aug. 30, 1941   4 Sheets-Sheet 1
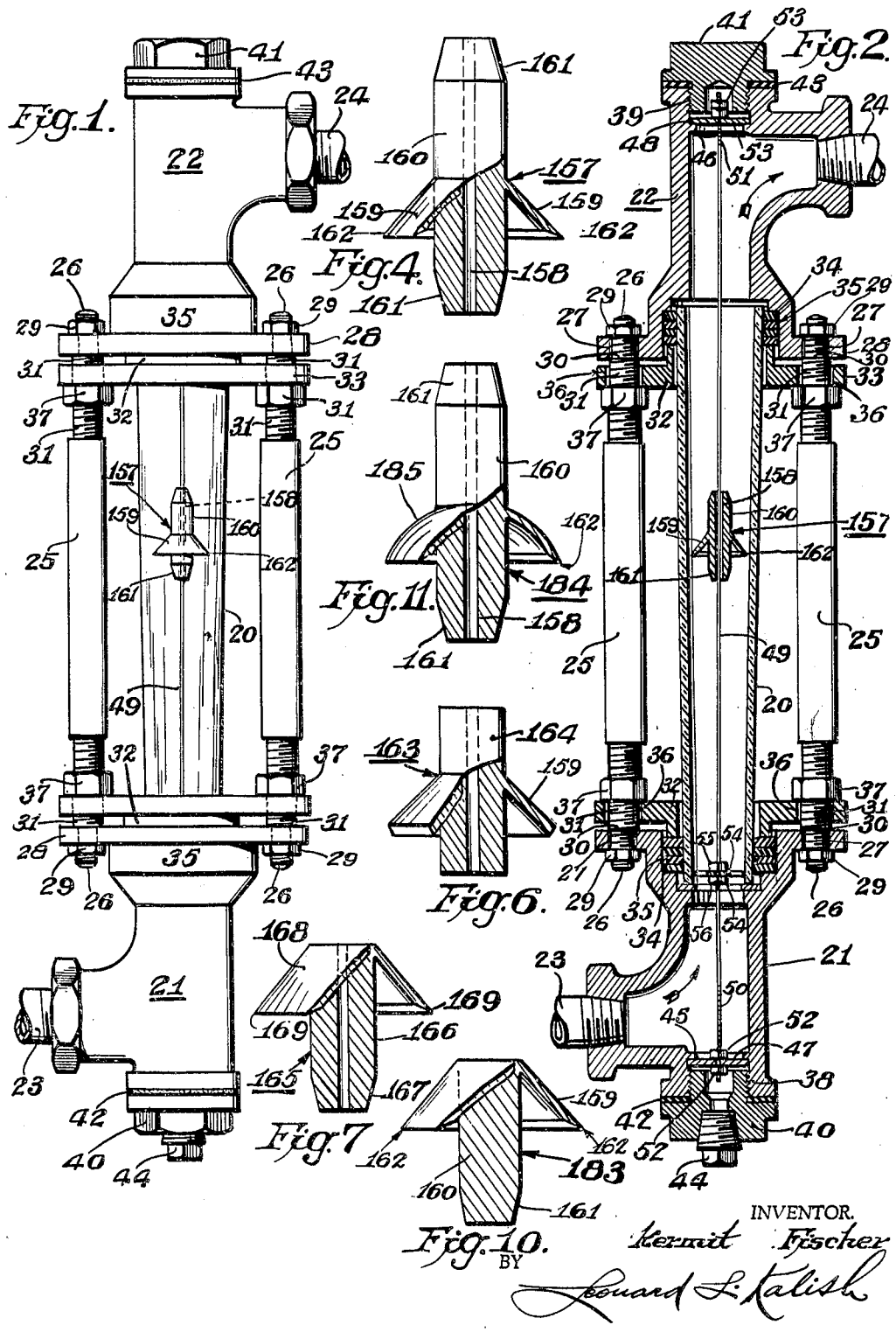
INVENTOR.
Kermit Fischer
BY Leonard L. Kalish

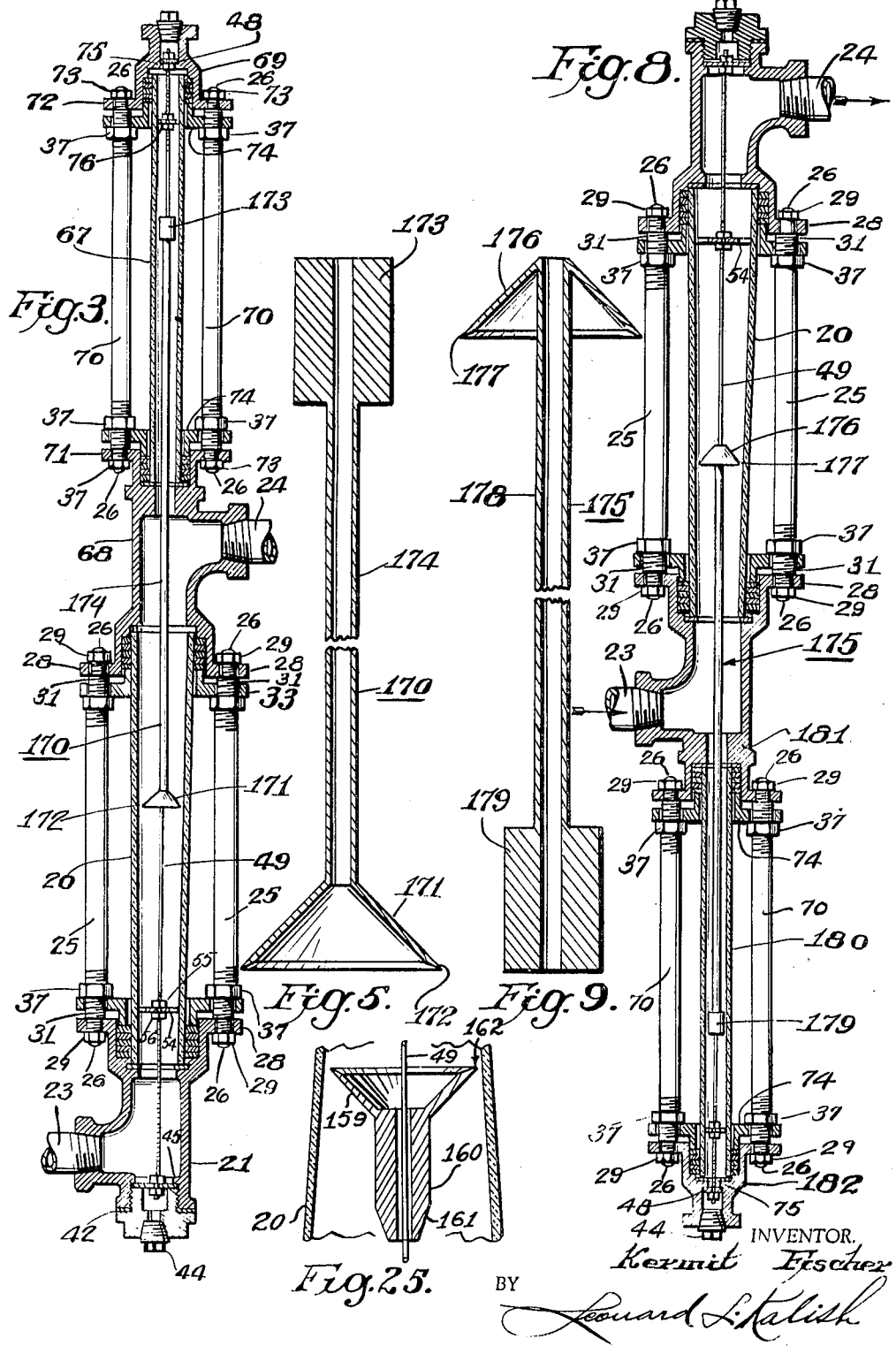

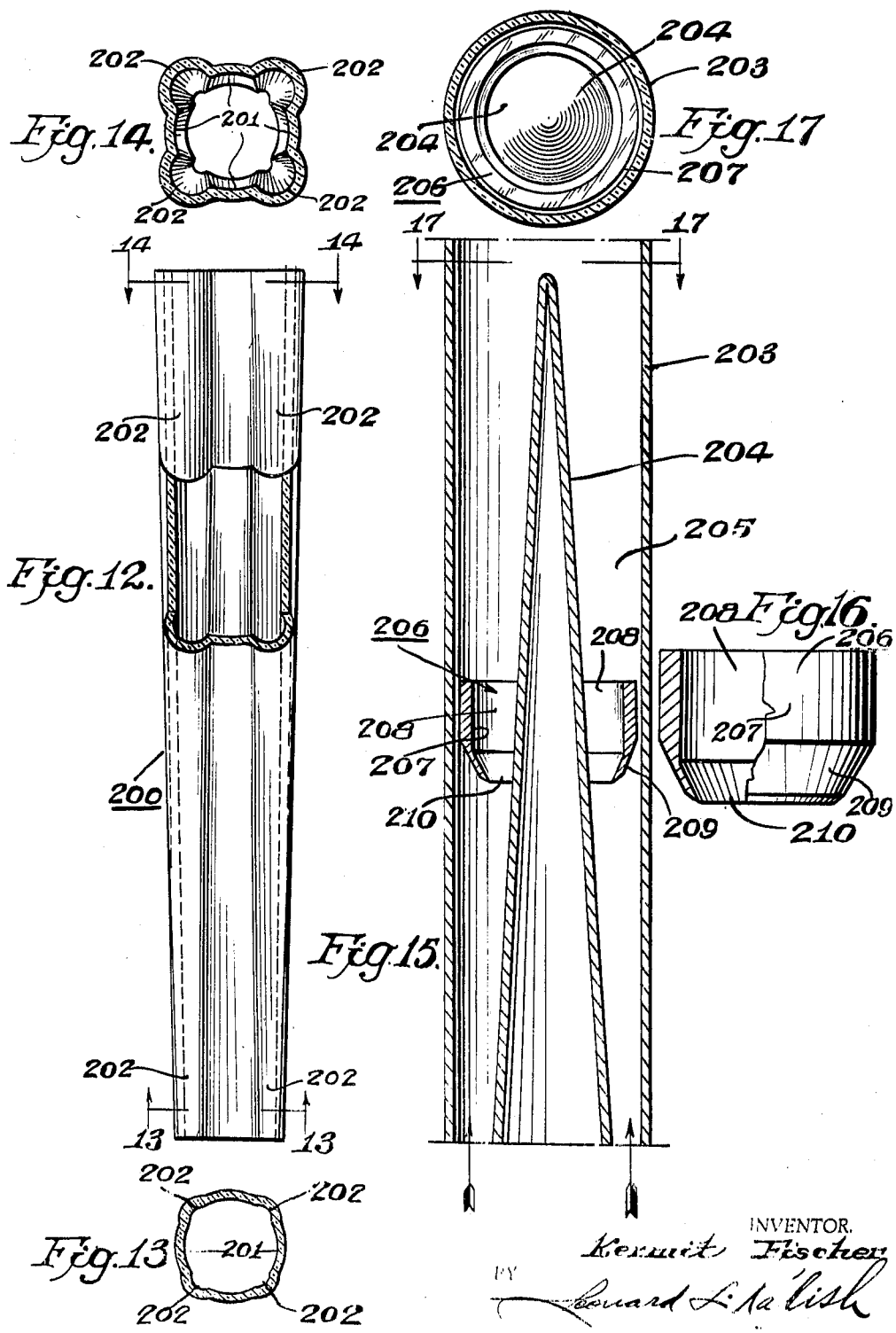

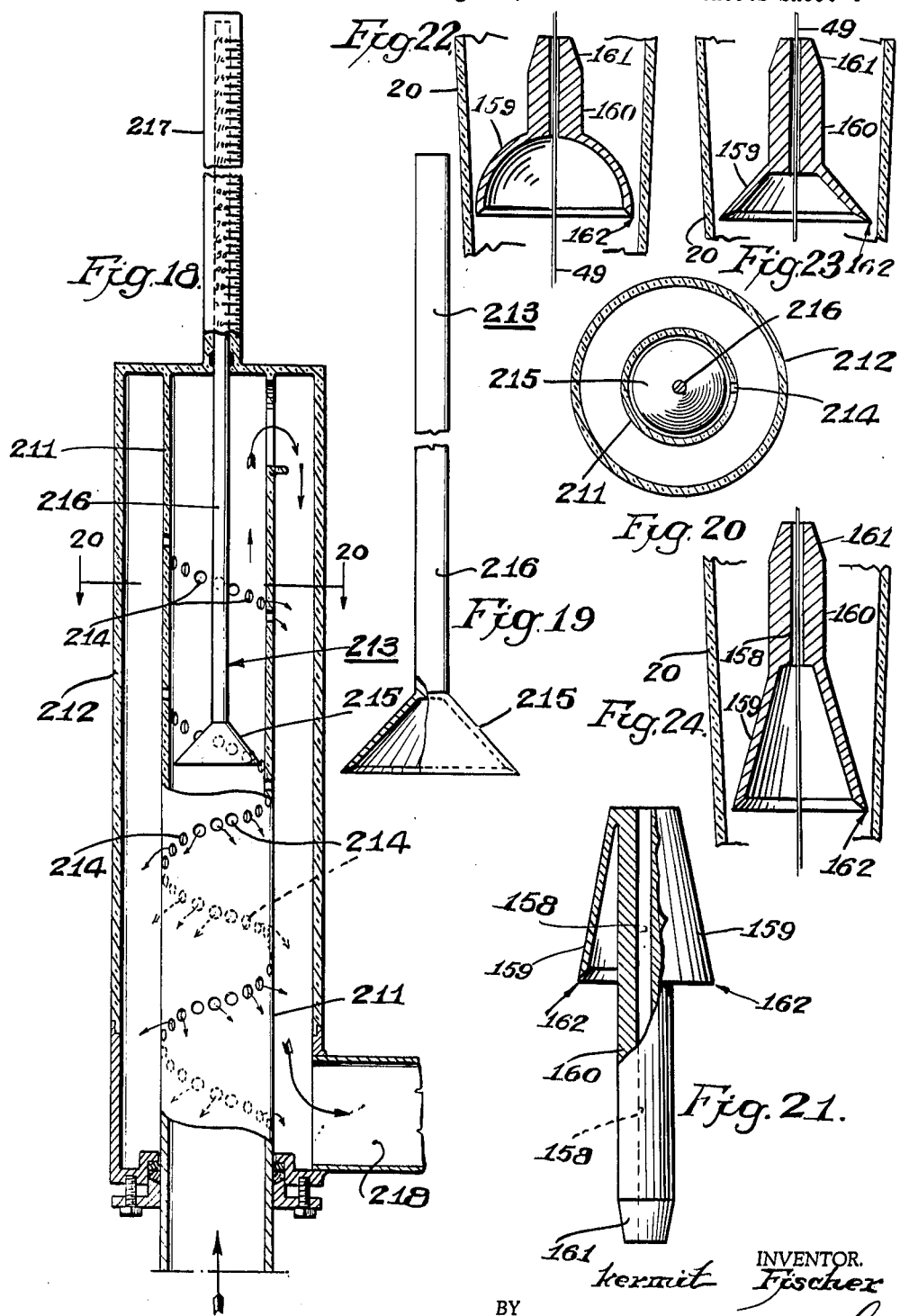

Patented June 6, 1944

2,350,343

UNITED STATES PATENT OFFICE 2,350,343

FLOWMETER

Kermit Fischer, Bridge Valley, Pa., assignor to Fischer & Porter Company, Hatboro, Pa., a corporation of Pennsylvania Application August 30, 1941, Serial No. 409,048

10 Claims. (Cl. 73—209)

The present invention relates to variable-area type rate-of-flow meters and it relates more particularly to flow meters, commonly known as rotameters, in which a float is adapted to move vertically within a vertical tube thereby to provide variable area for fluid flow.

An object of the present invention is to provide a flow meter which is more or less unaffected by changes in viscosity of the fluid being metered. Other objects, purposes and advantages of the present invention will be apparent in the following specification and appended claims and in the accompanying drawings.

In old-type flow meters embodying a float having a cylindrical body portion of a diameter slightly less than the smallest effective diameter of the metering tube, one serious disadvantage was the fact that the position of the float varied with fluctuations in the viscosity of the fluid being metered. Thus, the true rate-of-flow could be determined only by maintaining a constant check on the viscosity of the fluid being metered and by correcting the reading of the flow meter accordingly.

I have found that by employing a float in which the head portion is made in the form of a cup or pocket or concavity facing generally in the direction of the on-coming fluid, it is possible to construct a flow meter in which the viscosity effect of the fluid being metered is reduced to a point at which it becomes negligible and, in fact, may be reduced to zero.

For the purpose of illustrating the invention there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents an elevational view of one embodiment of the present invention.

Figure 2 represents a vertical cross-sectional view of the embodiment shown in Figure 1.

Figure 3 represents a vertical cross-sectional view of another embodiment of the present invention.

Figure 4 represents an elevational view on an enlarged scale of the float shown in Figures 1 and 2—parts being broken away better to reveal the construction thereof.

Figure 5 represents a cross-sectional view on an enlarged scale of the float shown in Figure 3.

Figure 6 represents an elevational view similar to that of Figure 4 of another float forming part of the present invention.

Figure 7 represents an elevational view similar to that of Figure 4 showing still another form of float.

Figure 8 represents a vertical cross-sectional view of a modification of the embodiment shown in Figure 3.

Figure 9 represents a cross-sectional view on an enlarged scale of the float shown in Figure 8.

Figure 10 represents an elevational view partly broken away of a float similar to the float shown in Figure 7 except that the central vertical opening therethrough is eliminated.

Figure 11 represents an elevational view of a modified float in which the head portion is made curved or bell-shaped instead of funnel-shaped or cone-shaped.

Figure 12 represents a fragmentary elevational view of another rotameter tube which may be used in place of the tube shown in Figure 1— parts being broken away better to reveal the construction thereof.

Figure 13 represents a cross-sectional view generally along the line 13—13 of Figure 12.

Figure 14 represents a cross-sectional view generally along the line 14—14 of Figure 12.

Figure 15 represents a cross-sectional view of another embodiment of the present invention.

Figure 16 represents an elevational view on an enlarged scale of the float shown in Figure 15— parts being broken away better to reveal the construction thereof.

Figure 17 represents a cross-sectional view generally along the line 17—17 of Figure 15.

Figure 18 represents a cross-sectional view of still another embodiment of the present invention.

Figure 19 represents an elevational view on an enlarged scale of the float shown in Figure 18— parts being broken away to better reveal the construction thereof.

Figure 20 represents a cross-sectional view generally along the line 20—20 of Figure 18.

Figure 21 represents an elevational view of another float forming part of the present invention; parts being broken away better to reveal the construction thereof.

Figures 22 and 23 and 24 show still further modified embodiments of the present invention.

Figure 25 represents a cross-sectional view generally similar to that of Figure 23 but showing another embodiment of the present invention in which the tube and float are vertically turned around and a float having a specific gravity less than that of the fluid is used.

In Figures 1 and 2, I have illustrated a rotameter representing one embodiment of the present invention in which a tapered glass tube 20 is supported between the terminal fittings 21 and 22 to which the pipes 23 and 24 (forming part of the fluid line) are connected. The fittings 21 and 22 are held together in rigid and spaced relation to each other by a plurality of spacer posts or standards 25 whose reduced and threaded terminal portions 26 pass through corresponding aligned holes 27 in the similar flanges 28 of the fittings 21 and 22. Flanges 28 are held firmly in position between the nuts 29 on the reduced-diameter terminal portions 26 and the shoulders 30 intermediate the reduced-diameter terminal portions 26 and the somewhat larger threaded portions 31 of the posts 25. Similar lower and upper stuffing glands 32, having flanges 33, are provided for compressing suitable packing rings or material 34 within the stuffing box portions or recesses 35 of the fittings 21 and 22, in sealing relation to the ends of the tapered glass tube 20 and the fittings. The flanges 33 are provided with aligned apertures 36 through which the large threaded portions 31 of the posts 25 extend. The nuts 37 serve adjustably to press the stuffing glands into place.

The fittings 21 and 22 are provided with threaded axial openings 38 and 39 which are normally closed by threaded plugs 40 and 41 and intervening sealing gaskets 42 and 43. The lower plug 40 may also have a further screw plug 44 provided therein.

Within the aligned apertures 38 and 39, similar inwardly extending flanges 45 and 46 are formed, which provide annular shoulders or abutments for supporting wire anchorage plates or washers 47 and 48. The wire anchorage plates or washers 47 and 48 are centrally apertured. The thin guide wire 49 threaded at its lower and upper ends as at 50 and 51, passes through the apertures in the anchorage plates 47 and 48, and is held therebetween by nuts 52 and 53 threaded thereon. The wire is placed under sufficient tension so as to maintain it under slight tension at all times, notwithstanding the temperature changes encountered in operation. Thus, sufficient tension is placed upon the wire, so that upon expansion due to increase in the temperature, it will still remain taut. A multi-spoked centering member 54 is also supported on the wire 49 by nuts 55 and 56, which together act accurately to center the wire in relation to the lower inner diameter of the tapered tube, and also to act as a bottom stop for the float—the center member 54 comprising a centrally apertured hub portion and three or more comparatively thin radial spokes extending laterally therefrom and fitting within the lower inner diameter of the tube 20 with a sufficiently small clearance so as accurately to center the wire.

The float designated generally by the numeral 157 and formed of a material having a specific gravity substantially greater than that of the liquid to be handled is provided with a central vertical aperture 158 extending therethrough, of a diameter which is sufficiently greater than the diameter of the guide wire 49 as to afford such working clearance as will permit the free travel of the float in relation to the wire.

As shown particularly in Figure 4, the float 157 is provided with a generally cylindrical body portion 160 with the ends thereof tapered to provide frusto-conical end portions 161. Said tapered end portions 161 are usually referred to as tail portions.

A funnel-shaped "head" portion 159 extends from said said body portion 160 at generally the centre thereof. The float 157 is used preferably in the position in which the funnel-shaped "head" portion extends with its open enlarged end below rather than above the point of junction with the body portion 160. The outer peripheral edge of said funnel-shaped head portion 159 may be thinned as at 162 to provide a knife-edge (more or less).

The body portion 160 is preferably made with a diameter not more than half the smallest diameter of the tapered tube 20.

The diameter of the large open end of the funnel-shaped head portion 159 is approximately the same as the smallest diameter of the tapered tube 20. The head portion 159 is preferably made relatively thin—the thickness of material constituting said head portion 159 being preferably not more than 10% of the distance from the peripheral edge to the point of juncture with the body portion.

In place of the float 157 shown in Figures 1, 2 and 4, it is possible to use the float 163 shown in Figure 6. The float 163 differs from float 157 in that its body portion 164 extends the entire axial dimension of the float—the frusto-conical end or tail portions being omitted. The float 163 also differs from the float 157 in not having a thinned peripheral knife-edge on the "head" portion 159 thereof.

Another float which may be used in place of floats 157 and 163, is the float 165 shown in Figure 7. Float 165 has a cylindrical body portion 166 and a lowermost frusto-conical tail portion 167. A funnel-like "head" portion 168 extends from the uppermost zone of said body portion 166—the "head" portion 168 being "knife-edged" at its outer periphery as at 169.

Many other modifications of the floats shown in Figures 4, 6 and 7 are possible and are contemplated by the present invention. Thus, the funnel-like "head" portion could be given any slope or angle with respect to the "body" portion—that is, the funnel could be made shallow or steep, depending upon the particular use to which the rotameter is to be put.

In order further to reduce the viscosity effect, I have provided a further modified form of construction illustrated in Figures 3 and 5.

In this embodiment, I may provide a float designated generally by the numeral 170. The float 170 has a lowermost funnel-shaped "head" portion 171 disposed within the tapered tube 20 and provided with a knife-edged outer periphery 172.

The float 170 is provided with a weight-giving body portion 173 which is spaced substantially above the "head" portion 171, by means of a thin connecting tubular spacer member 174—the "head" portion 171 alone being disposed within the tapered tube 20, while the weight-giving "body" portion 173 is disposed within an auxiliary tube 67 outside the path of liquid flow. The auxiliary tube 67 may be of glass or of metal and may be held between the modified upper fitting 68 and the auxiliary fitting 69.

In this modified form of construction, the fittings 68 and 69 are held together through posts 70 and flanges 71 and 72 and nuts 73, in a manner similar to the retention of the fittings 21 and 22 shown in Figures 1 and 2. The tube 67 is similarly held in sealed relation by stuffing glands 74. However, a similar flange 75 is provided in the upper fitting 69 which holds an anchorage plate 48 in the same manner. The upper spacer and stop member 76 may also be provided on the wire 49.

By this construction, the viscosity effect upon the float is further reduced. The drag on the connecting spacer tube 170 is very small since the velocity of the fluid in this area is reduced due to the greater cross-sectional area available for fluid flow. The weight-giving body portion 173, being in a stagnant body of fluid above the outlet as shown in Fig. 3, is not subject to frictional drag of the flowing fluid.

It is also possible to modify the construction shown in Figure 3 slightly by placing the auxiliary tube below the tapered tube 20 as shown in Figures 8 and 9.

Thus, in the embodiment shown in Figures 8 and 9 I may provide a float which is designated generally by the numeral 175. The float 175 has an uppermost funnel-shaped head portion 176 which has a knife-edged periphery 177. A relatively thin connecting tubular spacer portion 178 extends downwardly from said head 176 and has a weight-giving body portion 179 at its lower end.

The funnel-shaped head portion 176 is alone disposed within the tapered tube 20 while the weight-giving body portion 179 is disposed within an auxiliary tube 180 outside the path of fluid flow. The tube 180 may be of glass or metal and held between the modified lower fitting 181 and the auxiliary fitting 182 in a manner similar to that shown in and described in connection with Figures 1, 2 and 3.

While I prefer to use a guide-wire in order more accurately to centre and stabilize floats of the character shown in Figures 4, 5, 6, 7, 9, 11, 22, 23 and 24, it is possible to eliminate the guide wire and to use a solid float (that is, a float without the central drilled aperture therein). Thus, for example, in Figure 10 I have shown a float 183 which is similar to the float 165 of Figure 7 but which does not have the central drilled opening therethrough. When float 183 is used, the guide wire 49 shown in Figures 1 and 2 is not necessary since the float 183 will be more or less self-centering.

Just as float 165 may be modified to the construction shown in float 183, floats of Figures 4, 5, 6, 7, 9, 11, 22, 23 and 24 may be similarly modified to eliminate the centre opening therethrough, in which case such modified floats may be used without the guide wire 49.

All of the floats shown in Figures 4, 5, 6, 7, 9, 10, 11, 22, 23 and 24 generally have a somewhat greater density or specific gravity than that of the fluid being metered, so that, normally when there is no flow of fluid, the float is held, by gravity, at the lower smaller end of the tapered tube. When fluid flows through the tapered tube, its force will lift the heavier float (against gravity) upward within the tube—the final height of the float being determined by the velocity of the fluid flow.

Another modification of the present invention, shown in Figure 25, comprises turning around the rotameter so that the smaller end of the tapered tube is on top and employing a float having similar fluid-entrapping pockets facing the on-coming fluid, but whose over-all density or specific gravity is less than that of the fluid being metered. In this embodiment, the float being buoyant with respect to the fluid, the float will, when there is no fluid flow, remain at the upper smaller end of the tube. When fluid flow is started, the force thereof will move the float downwardly within the tube—the final position of the float being determined by the rate of flow of the fluid. In this embodiment, the float is also simply turned around so that the funnel-shaped fluid-turbulence chamber of the "head" portion extends upwardly from its point of junction with the body portion.

In Figure 11 there is shown a somewhat modified float 184 which is somewhat similar to float 157 (Figure 4), but which has a head portion 185 which is curved or bell-shaped instead of being funnel-shaped or cone-shaped as is the head 159 of the float 157. Just as float 157 may be modified to curvilinear shape of float 184 by substituting the curved "head" portion 185 in place of the cone-shaped "head" portion 159, so the other floats shown in the drawings may be similarly modified by replacing the several cone-shaped "head" portions with curved or bell-shaped "head" portions.

My present invention may be embodied in other forms of variable-area type of rate-of-flow meters.

Thus in Figures 12, 13 and 14 I have shown a flow-meter tube 200 which may be used in place of the conically tapered tubes shown in Figures 1 to 3. The metering tube 200 has a generally cylindrical inner bore 201 and is provided with a plurality (as, for example, 4) of tapered flutes 202 disposed circumferentially thereabout and extending generally axially of said tube 200. The flutes 202 may be considered as grooves which bulge radially outward of the inner cylindrical bore 201. The flutes 202 are relatively small and shallow at the intake end of the tube 200 as shown in Figure 13 and become larger and deeper at the discharge end of the tube 200 as shown in Figure 14.

Any of the floats hereinabove described in connection with the embodiments shown in Figures 1, 2 and 3, may be used with the tube 200. When there is only a slight flow of fluid through the tube 200, the float remains at the intake end of said tube 200 at which point the shallow portions of the flutes 202 provide a relatively small cross-sectional area for fluid flow across the float. As the rate of flow increases, the float is moved toward the discharge end of the tube where the flutes become larger and deeper so that a larger cross-sectional area is available for fluid flow past the float.

In Figure 15 I have shown another embodiment of my present invention in which there are provided a cylindrical outer tube 203 and a tapered inner rod, tube or post 204 co-axially disposed with respect to said cylindrical outer tube 203—an annular space 205 of varying cross-section being thus provided intermediate said outer and inner tubes 203 and 204 for fluid flow therebetween.

An annular float 206 is adapted to move vertically within the annular space 205. The float 206 is provided with a tubular "body" portion 207 disposed generally adjacent to the cylindrical outer tube 203—the central opening 208 of said "body" portion 207 being spaced substantially away from the tapered inner tube or stem 204.

An annular tapered "head" 209 extends from one end of the "body" portion 207. The head 209 extends radially inward of said body portion 207 and terminates in a central generally circular head-opening 210. The head-opening 210 has a diameter approximating the largest diameter of the inner tapered rod or stem 204. The "head" 209 is inclined in the direction of the oncoming fluid so that the head-opening 210 of the "head" 209 is closer to the inlet-end of the rotameter than is the "body" portion 207 of said float 206.

When there is little or no fluid flow, the float 206 is at the inlet end of the rotameter at which only a slight clearance exists between the head-opening 210 and the larger end of the tapered inner rod or stem 204. When the fluid flow increases the float is forced toward the discharge end of the rotameter at which a relatively larger clearance is provided between the head-opening 210 and the smaller end of the tapered rod or post 204.

Thus, the embodiment shown in Figure 15 operates in generally the same way as the embodiments shown in Figures 1 to 3 except that the varying annular clearance is provided intermediate the float and the inner tapered rod or stem (rather than intermediate the float and an outer tapered tube as in Figures 1 to 3).

While the head 209 of the float 206 of Figures 15 and 16 is shown as being formed with a conical taper, other modifications of the "head" portion are possible as discussed hereinabove. Thus, the "head" of the float might be given a curved cross-section and the taper of the "head" might be varied considerably as to angle.

In Figure 18 I have shown another embodiment of the present invention in which an inner generally cylindrical perforated or slotted metering tube 211 is provided within an outer manifolding jacket 212.

A float 213 is adapted to move vertically within the inner metering tube 211.

A series of relatively small openings 214 are provided within the inner tube 211 permitting the passage of fluid from within said tube 211 into the outer manifolding jacket 212.

The openings 214 are generally vertically distributed. In the embodiment shown in Figure 18, the openings 214 are formed generally in the shape of a spiral ascending the inner tube 211. However, the openings 214 could be arranged in other ways instead of in the spiral formation shown in Figure 18.

The float 213 includes a tapered or bell or funnel-shaped "head" 215 while a relatively thin "body" portion 216 extends upwardly from said head portion 215, terminating within an upper transparent indicator tube 217 generally co-axial with the inner metering tube 211.

The inner tube 211 is preferably made of metal and the position of the float within said tube 211 is indicated by the position of the upper end of the body portion 216 within the transparent indicator tube 217.

When there is little or no flow the float remains at the lower intake end of the inner tube 211. When the rate-of-flow increases, the float is forced upwardly within the inner tube 211 gradually uncovering additional openings 214. The more openings 214 there are uncovered the greater the amount of fluid which can escape therethrough into the outer jacket 212 to be drawn off through the outlet 218 of said jacket 212. Thus, the position of the float is a measure of the rate-of-flow of the fluid—the greater the rate of flow, the greater the height of the float and the greater number of openings 214 available for fluid discharge. In this embodiment, the annular clearance between the head 215 and the cylindrical tube 211 is always the same.

While the tapered head 215 of Figure 18 is shown as having a generally conical taper, many modifications are possible. Thus, the head might be given a curved cross-section and many different angles of taper are possible.

Instead of the openings 214 shown in Figure 18, it is possible to provide other forms of openings.

It seems that the moving fluid, encountering the metering float, with its concavity or cup-like or pocket-like portion facing the on-coming fluid, fills such concavity or cup-like recess or pocket, and the continued flow of fluid past the metering float (that is between the metering float and the wall of the metering chamber, tube, or post) creates a turbulence within the concavity or cup-like recess or pocket of the metering float, which turbulence might even extend to a zone somewhat outside the concavity or pocket. This turbulence reduces, if not indeed completely obliterates or eliminates any stream-line flow of the fluid past the metering edge of the "head" of the metering float, so that the drag of the moving fluid upon the metering float becomes uninfluenced by, or independent of, the viscosity of the fluid. Thus, the height of the float becomes independent of, or uninfluenced by, the viscosity of the fluid.

I have also found that by increasing the vertical depth of the fluid-entrapping pocket or turbulence pocket of the metering float, as for instance by making the conical pocket at an acute angle as shown generally in Figures 21 and 24, it is even possible to over-compensate for the viscosity effect of the fluid upon the metering float, so that a less viscous fluid will displace the metering float to a greater extent than a more viscous fluid (at the same rate-of-flow and the same specific gravity). This may be probably due to the fact that the turbulence of the more-or-less entrapped or pocketed fluid in the concavity or pocket of the metering float tends to create a slight amount of "solidity" in the pocket (or even slightly beyond the pocket) as the viscosity increases, so that with the pocket thus filled with a more viscous fluid there is either less turbulence within the pocket—or the more viscous fluid in the pocket tends to simulate (to a small degree) the effect of a solid or pocket-free float with a corresponding increase of the stream-lining of the flow past the metering edge. By this means, the pocket can be so shaped in depth and in the rate of convergence of the walls of the pocket, that the flow of a more viscous fluid past the metering float will exert slightly less drag upon the metering float than a less viscous fluid would exert (at the same rate-of-flow).

Having thus the means for over-compensating for the viscosity effect normally present in the old-fashioned metering floats of variable-area type flow-rate meters, the depth and rate of convergence of the walls of the turbulence pocket or fluid-entrapping pocket of the metering float is so proportioned or determined as to just eliminate the viscosity effect entirely, that is to bring its viscosity effect to the theoretical zero.

My present invention contemplates any float in which the "head," instead of extending horizontally out from the "body" portion and presenting a perpendicular surface to the flowing fluid, extends radially from the "body" portion and is inclined to any extent in the direction of the on-coming fluid—that is, my present invention contemplates any float in which the peripheral flow-constricting edge thereof is closer to the inlet end of the flow meter tube than is the point of junction of the float "head" and the float "body."

It is obvious that a great many modifications and variations of my present invention can be made without departing from the spirit thereof. Thus, the "head" of the float might be only slightly inclined toward the inlet end of the flow meter tube so that the float might be said to resemble somewhat a shallow Japanese parasol. On the other hand, the "head" of the float might be formed with a deep pocket or at a very steep angle, as shown, for example, in Figures 22, 21 and 24.

As hereinabove stated, the "head" might have a conical taper (either shallow or steep) or the "head" might be bell-shaped or curved in cross-section.

As used in the accompanying claims, the expression "tapered" includes curvilinear as well as conical taper unless more specifically limited.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

The invention having been hereinabove described, what is hereby claimed as new and desired to be protected by Letters Patent, is:

1. A flow meter for measuring the rate-of-flow of fluids and being unaffected by viscosity variations of fluids being metered, said flow meter including a vertical metering tube having axially-varying cross-sectional area and adapted for downward flow of fluid therethrough and a metering float disposed within said metering tube and adapted for vertical movement therein, said metering float having a specific gravity somewhat smaller than the specific gravity of the fluid being metered, said float having a body portion and a flow-constricting head extending radially and upwardly from its zone of junction with said body portion, said float having an annular periphery disposed radially adjacent the wall of said metering tube.

2. A flow meter including a generally vertical metering tube adapted for passage of liquid to be metered vertically therethrough, a co-axial elongated chamber spaced from said metering tube outside the path of liquid flow and in communication with said metering tube, and a vertically-movable float; said float having a weight-giving body portion disposed within said co-axial chamber, a tapered flow-constricting head portion disposed within said metering tube and a relatively thin spacer portion interconnecting said body portion and said head portion, said head portion being inclined in the direction of the on-coming liquid and presenting a liquid-entrapping turbulence-creating pocket to said liquid.

3. A flow meter for measuring rate-of-flow of liquids and being unaffected by variations in liquid viscosity including a vertical metering tube having an inlet end and an outlet end and adapted for passage of liquid vertically therethrough and a vertically-movable float within said tube, said float having an elongated weight-giving body portion extending vertically and having a substantial transverse dimension, said float having an annular tapered flow-constricting liquid-entrapping head portion extending toward the inlet end of said tube, said tapered head portion creating a viscosity-effect-dispelling liquid pocket on the inlet side thereof.

4. A flow meter for measuring rate-of-flow of liquids and being unaffected by variations in liquid viscosity including an elongated vertical metering chamber having an inlet end and an outlet end and having an annular vertically-extending metering surface, and a vertically movable float within said tube, said float having an elongated weight-giving vertically-extending body portion having a substantial transverse dimension and appreciably spaced from said metering surface, said float having an annular inclined head portion extending toward the inlet end of said chamber and toward said metering surface, said inclined head portion having its outer periphery terminating adjacent said metering surface to form an annular flow-constricting metering zone therewith, said inclined head portion creating a viscosity-effect-dispelling liquid pocket on the inlet side thereof and adjacent said flow-constricting metering zone.

5. A flow meter for measuring rate-of-flow of liquids and being unaffected by variations in liquid viscosity including an elongated vertical metering chamber having an inlet end and an outlet end having an annular vertically-extending metering surface, and a vertically movable float disposed within said tube, said float having an elongated weight-giving vertically-extending body portion having a substantial transverse dimension and appreciably spaced from said metering surface, said float having an annular inclined head portion extending from said body portion toward the inlet end of said chamber and toward said metering surface, said inclined head portion having its outer periphery terminating adjacent said metering surface to form an annular flow-constricting metering zone therewith, said inclined head portion creating a viscosity-effect-dispelling liquid pocket on the inlet side thereof and adjacent said flow-constricting metering zone, said float having a density slightly greater than the density of the liquid being metered.

6. A flow meter for measuring rate-of-flow of liquids and being unaffected by variations in liquid viscosity including a vertical metering tube having an inlet end and an outlet end and having an inner tapered metering surface, and a vertically movable float disposed within said tube, said float having an elongated weight-giving vertically-extending body portion having a substantial transverse dimension and appreciably spaced from said metering surface, said float having an annular inclined head portion extending toward the inlet end of said chamber and toward said metering surface, said inclined head portion having its outer periphery terminating adjacent said metering surface to form an annular flow-constricting metering zone therewith, said inclined head portion creating a viscosity-effect-dispelling liquid pocket on the inlet side thereof and adjacent said flow-constricting metering zone.

7. A flow meter for measuring rate-of-flow of liquids and being unaffected by variations in liquid viscosity including a vertical metering tube having an inlet end and an outlet end and having an inner tapered metering surface, and a vertically movable float disposed within said tube, said float having an elongated weight-giving body portion extending along the axis of said tube, said body portion having a substantial transverse dimension and being appreciably spaced from said metering surface, said float having an annular inclined liquid-entrapping head portion extending from said body portion toward the inlet end of said metering tube and toward said metering surface, said inclined head portion having its outer periphery terminating adjacent said metering surface to form an annular flow-constricting metering zone therewith, said inclined head portion creating a viscosity-effect-dispelling liquid pocket on the inlet side thereof and adjacent said flow-constricting metering zone.

8. A flow meter for measuring rate-of-flow of liquids and being unaffected by variations in liquid viscosity including a vertical metering tube having an upwardly-inclined inner metering surface, said tube being adapted for upward passage of liquid therethrough, and a vertically movable float disposed within said tube, said float having an elongated weight-giving vertically-extending body portion having a substantial transverse dimension and being appreciably spaced from said metering surface, said float having an annular inclined head portion extending from the lower end of said body portion toward the bottom of said tube and toward said metering surface, said inclined head portion having its outer periphery terminating adjacent said metering surface to form an annular flow-constricting metering zone therewith, said inclined head portion creating a viscosity-effect-dispelling liquid pocket on the upstream side thereof and adjacent said flow-constricting metering zone.

9. A flow meter for measuring rate-of-flow of liquids and being unaffected by variations in liquid viscosity including a vertical metering tube having an upwardly-inclined inner metering surface, said tube being adapted for upward passage of liquid therethrough, and a vertically movable float disposed within said tube, said float having an elongated weight-giving vertically-extending body portion having a substantial transverse dimension and appreciably spaced from said metering surface, said float having an annular inclined head portion extending from the lower end of said body portion toward the bottom of said tube and toward said metering surface, said inclined head portion having its outer periphery terminating adjacent said metering surface to form an annular flow-constricting metering zone therewith, said inclined head portion creating a viscosity-effect-dispelling liquid pocket on the upstream side thereof and adjacent said flow-constricting metering zone, said head portion having a generally conical taper.

10. A flow meter for measuring rate-of-flow of liquids and being unaffected by variations in liquid viscosity including a vertical metering tube having an upwardly-inclined inner metering surface, said tube being adapted for upward passage of liquid therethrough, and a vertically movable float disposed within said tube, said float having an elongated weight-giving vertically-extending body portion having a substantial transverse dimension and appreciably spaced from said metering surface, said float having an annular inclined head portion extending from the lower end of said body portion toward the bottom of said tube and toward said metering surface, said inclined head portion having its outer periphery terminating adjacent said metering surface to form an annular flow-constricting metering zone therewith, said inclined head portion creating a viscosity-effect-dispelling liquid pocket on the upstream side thereof and adjacent said flow-constricting metering zone, said head portion having a generally curvilinear taper.

KERMIT FISCHER.